(12) United States Patent
Ouchi et al.

(10) Patent No.: US 7,170,567 B2
(45) Date of Patent: Jan. 30, 2007

(54) PROJECTION TYPE IMAGE DISPLAY APPARATUS

(75) Inventors: Satoshi Ouchi, Kamakura (JP); Tomohiro Miyoshi, Fujisawa (JP); Taro Imahase, Fujisawa (JP); Masahiko Yatsu, Fujisawa (JP); Koji Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 578 days.

(21) Appl. No.: 10/379,312

(22) Filed: Mar. 3, 2003

(65) Prior Publication Data

US 2003/0164901 A1    Sep. 4, 2003

(30) Foreign Application Priority Data

Mar. 4, 2002    (JP) .............................. 2002-056868

(51) Int. Cl.
*H04N 5/74*    (2006.01)
*G02F 1/00*    (2006.01)

(52) U.S. Cl. ........................... 348/750; 348/756; 349/8
(58) Field of Classification Search ................ 348/744, 348/756, 757, 759, 760, 750, 751; 359/634, 359/636, 638, 639; 353/38, 20, 31; 349/8, 349/57, 95
See application file for complete search history.

(56) References Cited

U.S. PATENT DOCUMENTS 5,528,318 A    6/1996    Janssen (Continued)

FOREIGN PATENT DOCUMENTS

EP    1070984 A1    1/2001

(Continued)

OTHER PUBLICATIONS

Shimizu, Jeffrey A., "Single Panel Reflective LCD Optics," *Phillips Research*, 345 Scarborough Road, Briarcliff Manor, NY 10510 USA.

*Primary Examiner*—Michael H. Lee
(74) *Attorney, Agent, or Firm*—Townsend and Townsend and Crew LLP (57) ABSTRACT

A projection type image display apparatus includes a light source to emit light; a polarizing beam splitter to polarize the light received from the light source; a first lens array including a plurality of first lens cells having rectangular shapes to receive the light from the polarizing beam splitter, each first lens cell having a first side and a second side, the first side being longer than the second side, the first lens array having a rectangular shape, the first lens array having a third side and a fourth side, the third side being longer than the fourth side, the first sides of the first lens cells and the third side of the first lens array extending along a first direction; a second lens array including a plurality of second lens cells and being configured to receive the light from the first lens array, the second lens array having a rectangular shape and having a fifth side and a sixth side, the fifth and sixth sides of the second lens array having substantially the same dimensions as the third and fourth sides of the first lens array; a color separator configured to separate the light from the second lens array into a plurality of light rays of different colors; an image display device configured to form an optical image from the plurality of light rays; and a projector configured to project the plurality of light rays emitted from the image display device as a color image.

15 Claims, 9 Drawing Sheets

U.S. PATENT DOCUMENTS

6,332,684 B1 * 12/2001 Shibatani et al. ............. 353/31
6,493,149 B2 * 12/2002 Ouchi ....................... 359/634
6,511,184 B2    1/2003 Yamagishi et al.
6,860,607 B2 *  3/2005 Yanagisawa ................. 353/38

FOREIGN PATENT DOCUMENTS

JP      2001-350112 A    12/2001
KR      2001-42282        5/2001

* cited by examiner

PROJECTION TYPE IMAGE DISPLAY APPARATUS

CROSS-REFERENCES TO RELATED APPLICATIONS

The present application is related to and claims priority from Japanese Patent Application No. 2002-56868, filed on Mar. 4, 2002.

BACKGROUND OF THE INVENTION

A conventional optical unit has been commonly known in which, after light from a lamp passes through a first and a second lens array, a polarizing beam splitter (PBS), and a collimator lens, it is separated into R, B, and G light rays by means of plural dichroic mirrors; then the R, B, G light paths are altered through rotary prisms respectively so that the respective color light rays are directed onto a light valve device (hereinafter simply called "panel") in different areas and the areas on which color light rays are thrown scroll in a prescribed direction on the panel sequentially.

The above conventional optical unit has an advantage that it uses a single-plate panel and is easy to assemble. However, since it requires plural rotary prisms, it cannot be compact. In addition, it uses not only plural rotary prisms but also many lenses and dichroic mirrors, so it is expensive and its light utilization efficiency is low due to the use of many lenses. Besides, the rotational positions of plural rotary prisms must be controlled in order to adjust the spots on the panel on which the R, G and B light rays are thrown and this adjustment is troublesome. Further, since plural motors are used, anti-noise measures must be taken.

Furthermore, in the conventional optical unit, R, G, and B light rays from dichroic mirrors overlap each other on a rotary polyhedron, causing mixing of the colors or contrast deterioration due to stray light.

BRIEF SUMMARY OF THE INVENTION

An embodiment of the present invention provides a new, useful image display technique which minimizes the possibility of color mixing of light rays directed onto the panel and image contrast deterioration and improves the light utilization efficiency.

In one embodiment an optical unit includes a light source; an image display device (panel) which makes an optical image from light rays emitted from the light source according to an image signal; a first lens array which has a first group of rectangular lens cells (first lens cells); a second lens array which has a second group of lens cells (second lens cells) and forms an image of each lens cell of the first group of lens cells on the image display device; color separation component which separates light emitted from the light source into light rays of plural colors; a rotary polyhedron which receives light rays of plural colors emitted from the color separation component, emits them with their optical axes in different directions, directs them onto the image display device in different areas and scrolls, in one direction, the areas to where they are directed; and a projector which projects light rays emitted from the image display device as a color image, wherein the whole second lens array is rectangular and oriented in the same way as the rectangular first lens cells.

In one embodiment of the present invention, a projection type image display apparatus includes a light source to emit light; a polarizing beam splitter to polarize the light received from the light source; a first lens array including a plurality of first lens cells having rectangular shapes to receive the light from the polarizing beam splitter, each first lens cell having a first side and a second side, the first side being longer than the second side, the first lens array having a rectangular shape, the first lens array having a third side and a fourth side, the third side being longer than the fourth side, the first sides of the first lens cells and the third side of the first lens array extending along a first direction; a second lens array including a plurality of second lens cells and being configured to receive the light from the first lens array, the second lens array having a rectangular shape and having a fifth side and a sixth side, the fifth and sixth sides of the second lens array having substantially the same dimensions as the third and fourth sides of the first lens array; a color separator configured to separate the light from the second lens array into a plurality of light rays of different colors; an image display device configured to form an optical image from the plurality of light rays; and a projector configured to project the plurality of light rays emitted from the image display device as a color image. The beam splitter is configured to enable the first lens array to have a rectangular shape.

In one embodiment, a projection type image display apparatus includes a light source to emit light; a polarizing beam splitter to polarize the light received from the light source; a first lens array including a plurality of first lens cells having rectangular shapes to receive the light from the polarizing beam splitter; a second lens array including a plurality of second lens cells and being configured to receive the light from the first lens array and emit principal light and unwanted light; a color separator configured to separate the principal light from the second lens array into a plurality of light rays of different colors and prevent the unwanted light from being added to the plurality of light rays; a rotary polyhedron configured to receive the plurality of light rays from the color separator and direct the plurality of light rays onto the image display device, the directed plurality of light rays having optical axes in different directions; an image display device configured to form an optical image from the plurality of light rays; and a projector configured to project the plurality of light rays emitted from the image display device as a color image.

In another embodiment, a projection type image display apparatus includes a light source; a first lens array including a plurality of first lens cells having first, second, third and fourth sides and being configured to receive light from the light source, the first and third sides facing each other and the second and fourth sides facing each other, the first and second, having lengths of D1 and D2, respectively; a second lens array including a plurality of second lens cells and being configured to receive the light from the first lens array; a cylindrical lens configured to receive the light from the second lens array and emit the light to an optical component, the cylindrical lens forming a light spot on the optical component, the light spot having fifth, sixth, seventh, and eighth sides corresponding to the first, second, third, and fourth sides of one of the first lens cell, the fifth and sixth sides having lengths of D5 and D6, respectively; a lens assembly configured to converge at least a portion of the light emitted from the cylindrical lens; a color separator configured to receive the light from the cylindrical lens via the collimator lens and separate the light into a plurality of light rays of different colors, the color separator being the optical component whereon the light spot is formed, wherein a ratio of D5 to D6 is different than a ratio of D1 to D2; a rotary polyhedron configured to receive the plurality of light rays from the color separator and direct the plurality of light rays onto an image display device that is configured to form optical images from the directed plurality of light rays received from the rotary polyhedron, wherein two or more of the directed plurality of light rays having optical axes extending in different directions; and a projector configured to project light rays emitted from the image display device as a color image.

Other features and advantages of the invention will appear more fully from the following description.

DETAILED DESCRIPTION OF THE INVENTION

Next, several preferred embodiments of the present invention will be described referring to the accompanying drawings.

Figure 1:
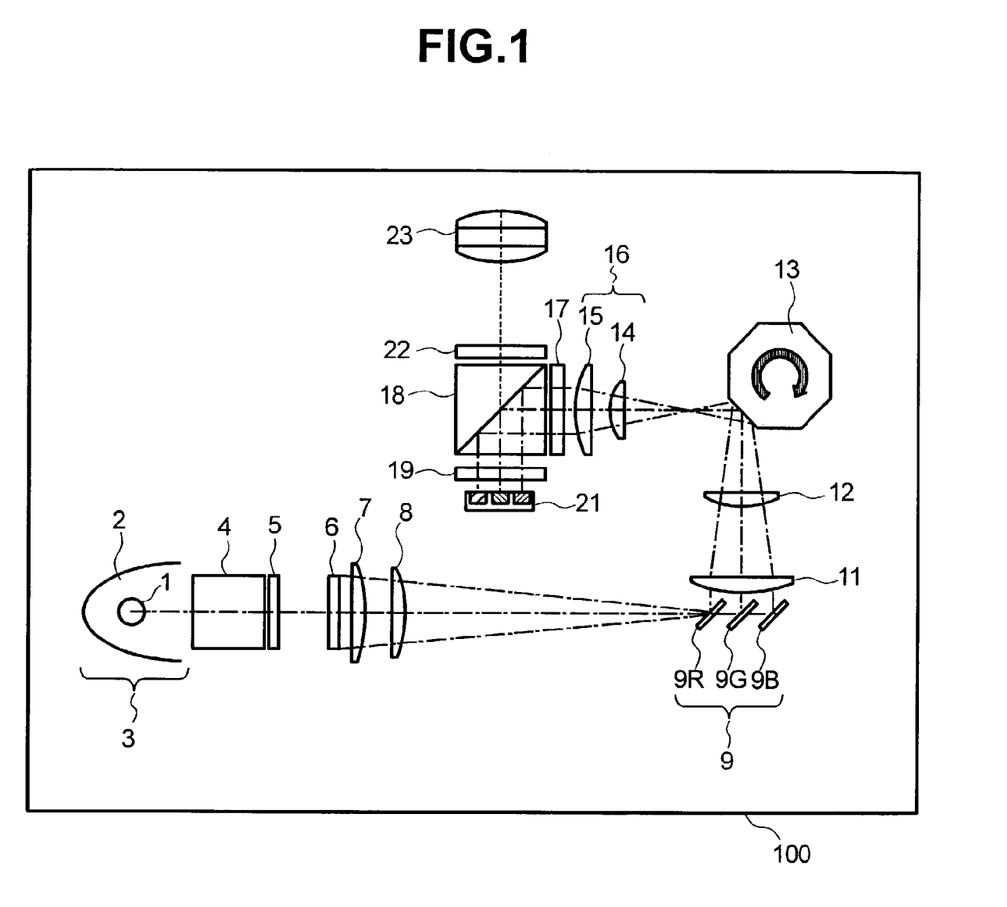
FIG. 1 shows a schematic diagram of an optical unit according to one embodiment of the present invention.

FIG. 1 shows the general structure of an optical unit included in a display device 100 according to a first embodiment of the present invention. The display device 100 is a projection-type television according to one embodiment of the present invention.

As shown in the figure, light from a lamp unit 3, which is obtained by reflecting light from a lamp (arc) 1 with a reflector 2, passes through a polarizing beam splitter 4 (hereinafter called PBS) to convert the light to either S polarized light or P polarized light, then the polarized light enters a first lens array 5 to form plural secondary lamp images. Then, the light from the first lens array 5 passes through a second lens array 6 which includes a plurality of condenser lenses, lies in the vicinity of the area where plural secondary lamp images are formed, and forms an image of each lens of the first lens array 5 on a liquid crystal panel 21 (hereinafter called the "panel" or "image display device") which will be mentioned later.

The light which has passed through the second lens array 6 passes through a first lens 7 and a second lens 8, which have functions of converging the light, and reaches a color separator (for example, color separation mirror set 9), which includes dichroic mirrors or the like, and separates white light into several color light rays. The lens 7 and 8 are hereinafter referred to as collimator lens 7 and 8, respectively. The color separation mirror set 9 uses an R dichroic mirror 9R to reflect R (red) light, a G dichroic mirror 9G to reflect G (green) light, and a B dichroic mirror 9B to reflect B (blue) light. The R dichroic mirror 9R, which reflects R light, transmits G light and B light. The G dichroic mirror 9G, which reflects G light, transmits B light. After the light is separated into R, G, and B light rays and reflected by the color separation mirror set 9 in this way, the R, G, and B light rays pass through a first relay lens 11 and a second relay lens 12 and are directed onto different areas of a reflection type rotary polyhedron 13 to be reflected by the polyhedron 13, e.g., an octahedron. Although the reflection type rotary polyhedron 13 is an octahedron in this embodiment, the number of faces of the polyhedron 13 is not limited.

When R, G, and B light beams are reflected by one of the faces of the polyhedron 13, the optical axes of the R, G, and B light beams light once cross. When two of the R, G, and B light beams are reflected by one of the faces of the reflection type rotary polyhedron 13, the optical axes of these beams cross. The R, G, and B light rays which have exited the reflection type rotary polyhedron 13 pass through an imaging lens system 16 composed of a third relay lens 14 and a fourth relay lens 15, etc., and through a first polarizing plate 17. After that, they are reflected by PBS 18 as an analyzer, and passed through a λ/4 wavelength plate 19 and directed onto a panel 21 in different areas. The light from the panel 21, the polarization direction of which has been changed, is led through PBS 18, then through a polarizing plate 22 and finally through a projection lens 23 to be projected enlarged on a screen (not shown).

The portion from the lamp unit 3 to the color separation mirror set 9 constitutes an illumination system while the portion from the first relay lens to the fourth relay lens constitutes an imaging system according to one embodiment of the present invention.

The panel 21 may be either of the following: a transmission type liquid crystal panel (LCD), a reflection type liquid crystal panel (LCOS), a ferroelectric liquid crystal panel (FLC) and a digital micro-mirror panel. In the present invention, either of these panels may be used as appropriate. In this embodiment, the panel 21 may be an LCOS, LCD or FLC.

In the embodiment shown in FIG. 1, the size and number of faces of the reflection type rotary polyhedron 13 are of predetermined configuration, so that R, G, and B light rays on the panel 21 scroll in one direction at a given speed as the polyhedron rotates.

Instead of the dichroic mirrors 9R, 9G, and 9B, dichroic prisms combined with a reflection mirror or prism may be used in a way that the dichroic prisms separate light into R, G, and B light rays and the reflection mirror or prism controls the direction of the optical axes.

Figure 2:
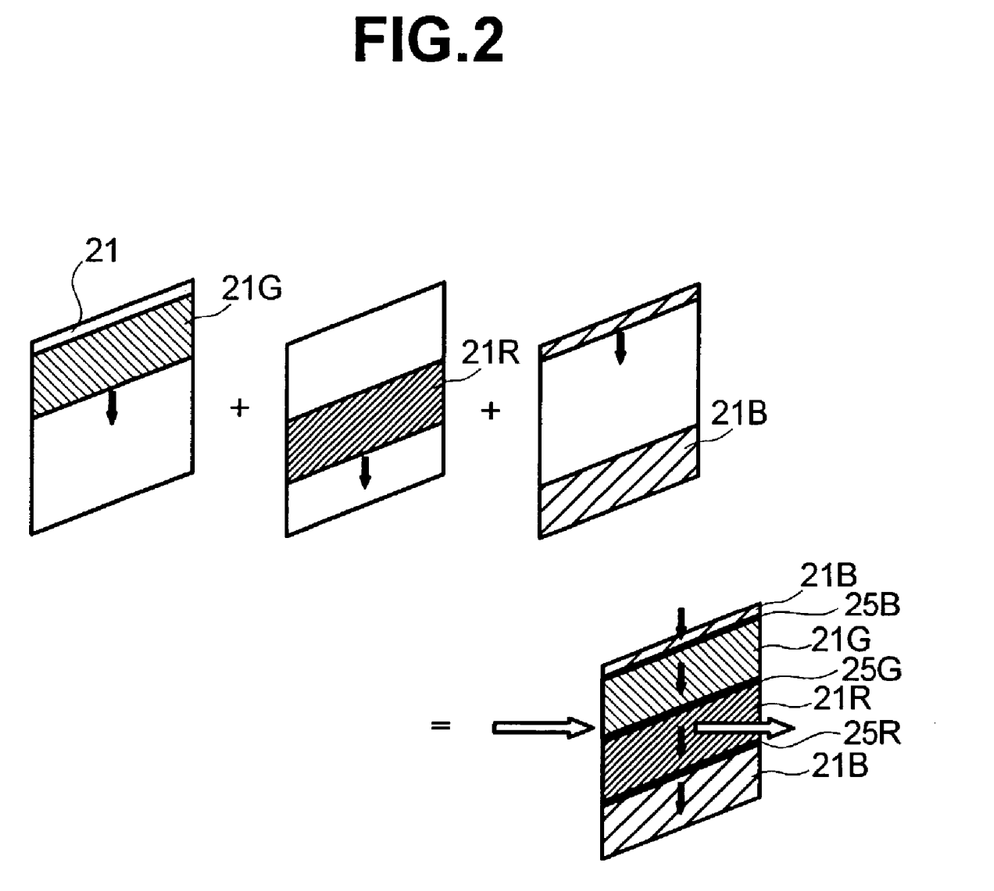
FIG. 2 is a perspective view of a display device illustrating how light rays of three colors are directed onto a display device according to one embodiment of the present invention.

Referring to FIG. 2, a method of directing the R, G, and B light rays, which have been reflected by the rotary polyhedron 13 at a certain time, onto a display device 21 is explained below.

FIG. 2 is a perspective view illustrating how light rays of three colors are directed onto a display device. In FIG. 2, 21R represents an area to where R light rays are directed; 21G an area to where G light rays are directed; and 21B an area to where B light rays are directed. The R, G, and B light rays are directed onto the display device 21 at the same time. Numerals 25R, 25G, and 25B indicate areas to where R, G, and B light rays are directed next respectively; addresses are written onto these areas for R, G, and B light rays to be directed there next. The size of these areas depends on write time for the display device 21, namely the display device 21's response time and scroll speed. If the response time is even shorter than the time required to scroll by one line, the size may be equivalent to one line. On the other hand, if the response is slow, the number of lines to be allocated to the areas should suit the response time.

For the light rays to be first guided from above on the display device 21 while being scrolled, color code addresses are written onto the color areas 21R, 21G, and 21B from top to bottom in order, and then R, G, and B light rays are directed onto the respective color areas from top to bottom. Meanwhile, addresses are written onto the areas 25R, 25G, and 25B. After addresses have been written onto the areas 25R, 25G, and 25B, the R, G, and B light rays directed onto the areas 21R, 21G, and 21B move downward on the display device 21 by the amount equivalent to the areas 25R, 25G, and 25B so that the R, G, and B light rays are directed onto the areas 25R, 25G, and 25B. After addresses have been written onto the areas 25R, 25G, and 25B, addresses are written onto the next line(s) below them. In this way, the areas to where R, G, and B light rays are directed downward sequentially.

In this embodiment, the areas 21R, 21G, and 21B are substantially identical in size, so the shape of each lens of the first lens array 5 should be similar to the shape of the areas 21R, 21G, and 21B of the display device 21 which are occupied by R, G, or B light rays (strip-shaped).

Scrolling may be done on the panel 21 from top to bottom or vice versa, or from left to right or vice versa.

Figure 3:
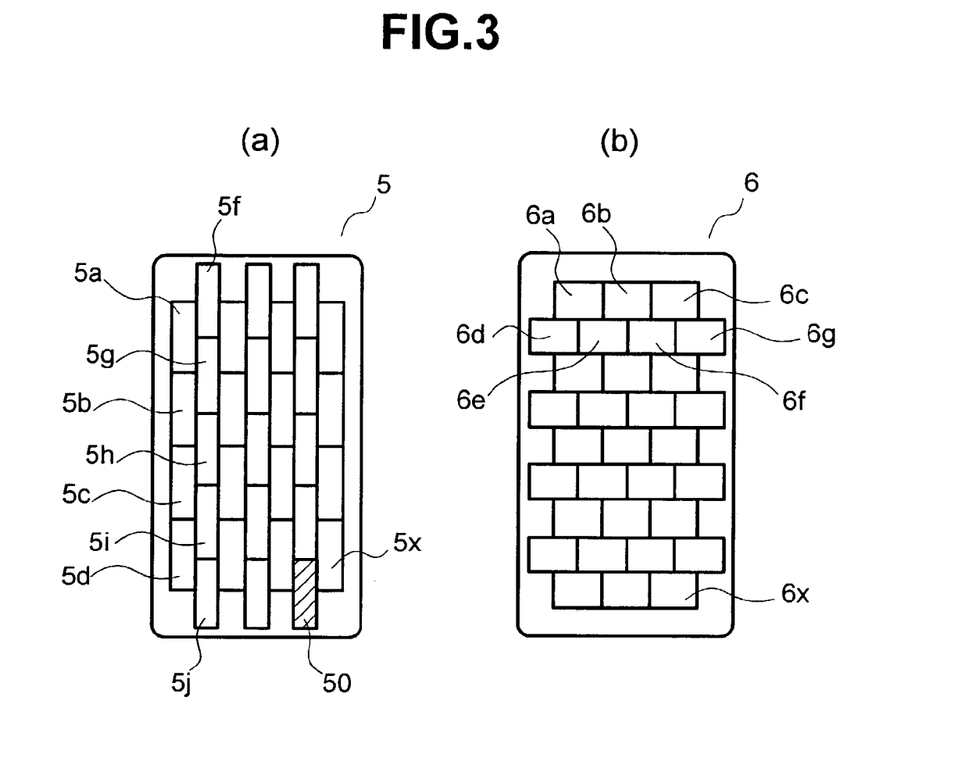
FIG. 3A is a major-surface views of a first lens array according to one embodiment of the present invention.
FIG. 3B is a major-surface views of a second lens array according to one embodiment of the present invention.
Figure 4A:
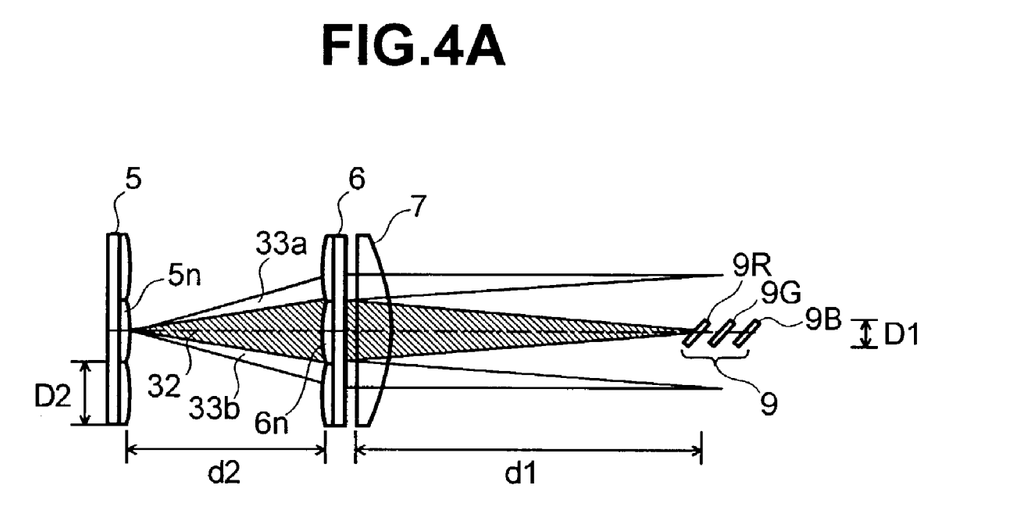
FIG. 4A is a schematic diagram illustrating how light rays from the first and second lens arrays of FIGS. 3A and 3B are directed onto a color separation mirror according to one embodiment of the present invention.
Figure 4B:
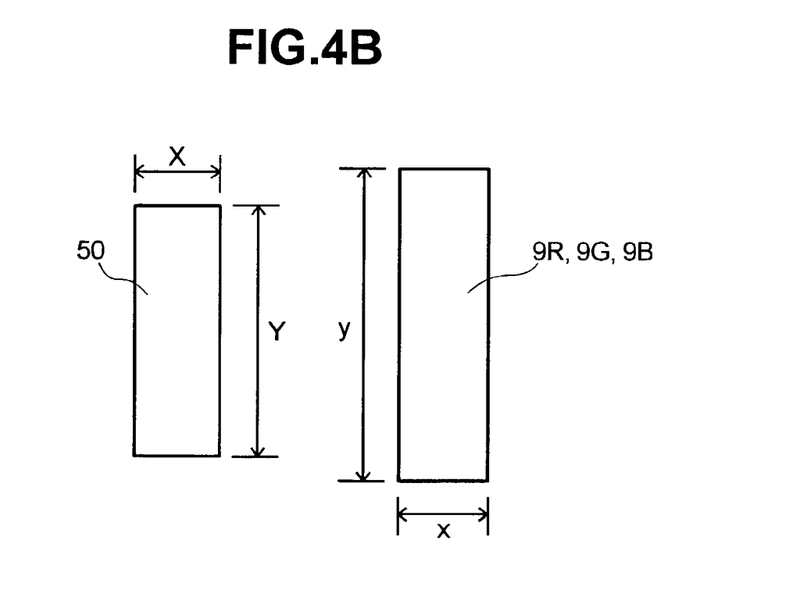
FIG. 4B illustrates a lens cell of a first lens array according to one embodiment of the present invention.
Figure 5:
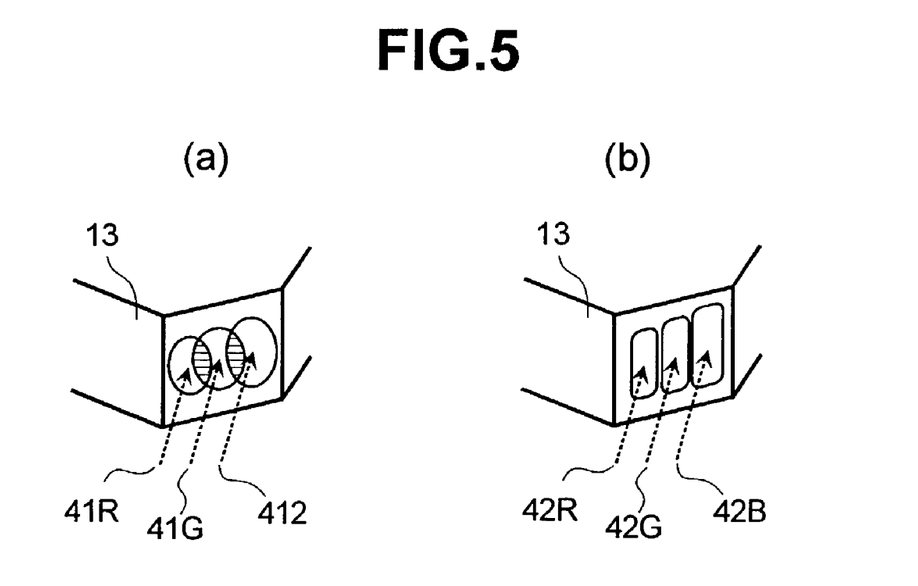
FIG. 5A shows light spots produced by a conventional second lens array.
FIG. 5B shows light spots produced by a second lens array according to one embodiment of the present invention.

Next, this embodiment is explained in detail referring to FIGS. 3 to 5.

FIG. 3A and FIG. 3B are a top view of a first lens array and that of a second lens array, respectively. Regarding the first lens array 5 used in the embodiment shown in FIG. 1 or FIG. 3A, the lens cells 5a–5x (hereinafter sometimes called the first lens cells) are rectangular and arranged in a staggered pattern as illustrated in FIG. 3A. In other words, the rectangular lens cells 5a–5d in the first column are aligned with their longer sides provided along a vertical direction, and the rectangular lens cells 5f–5j in the second column are also aligned with their longer sides provided along a vertical direction. In addition, regarding the lens cells 5f–5j in the second column, the shorter sides of the lens cells abut those of the neighboring lens cells (namely lens cells 5f and 5g, 5g and 5h, 5h and 5i) at substantially the midpoints of the longer sides of the lens cells 5a–5d. The third column is adjacent to the second column in the same manner as the first column is; the fourth column is adjacent to the third column in the same manner as the second column is. Hereinafter, this arrangement will be referred to as a "staggered pattern." In one embodiment, the lens cells 5a–5x of the first lens array 5 have the same size and dimensions.

As detailed later, in the illumination system, the first lens cells 5a–5x form an image in the vicinity of the color separation mirror set 9; and in the imaging system, R, G, and B light rays (as a result of color separation by the color separation mirror set 9) whose sectional shape is similar to that of the lens cells 5a–5x are reflected by the reflection type rotary polyhedron 13 and focused on the panel 21. Consequently, R, G and B light spots with a shape similar to that of the first lens cells 5a–5x appear on the panel 21. Therefore, it is preferable that the first lens cells 5a–5x be shaped as follows.

Assuming that the length of the panel 21 in the direction where light rays of a color are thrown (the length of the longer side of a typical panel) is expressed by a, the length of the panel 21 in the direction where light rays of plural colors are thrown (the length of the shorter side) by b (a>b), and light rays of n colors are directed onto the panel 21, the first lens cells 5a–5x (FIG. 3A) are shaped so that their longer to shorter side ratio is a: (b/n) or less. For example, if the aspect ratio of the panel 21 is 4:3 and three kinds of light (R, G, B) are directed onto the panel 21, it is desirable that the longer to shorter side ratio of the first lens cells 5a–5x be 4:3/3 or less, or 4:1 or less, if the addressing width is not taken into account. As another example, if the aspect ratio of the panel 21 is 16:9, it is desirable that the longer to shorter side ratio of the first lens cells 5a–5x be 16:9/3 or less, or 16:3 or less. n should be determined taking into consideration the addressing width (25R, 25G, 25B in FIG. 2). In one embodiment, the aspect ratio is about 4:1 to about 16:9/4.

As shown in FIG. 3B, regarding the lenses 6a–6x (hereinafter sometimes called the second lens cells) of the second lens array 6, which are each almost square, the lens cells 6a–6c in the first row and the lens cells 6d–6g in the second row are arranged in a staggered pattern like the lens cells 5a–5j in the first and second columns shown in FIG. 3A. In one embodiment, the lens cells 6a–6x of the second lens cell array 6 have the same size and dimensions.

The second lens cells have a length-to-width aspect ratio of from about 1:1 to 1:2. The length-to-width aspect ratio can also be considered as a height-to-width aspect ratio depending on the angle of the view. The second lens cells are arranged in a plurality of rows that are aligned horizontally. The second lens array 6 has an overall shape like a rectangle extending longitudinally along the longer sides of the rectangular lens cells 5a–5x of the first lens array 5.

Referring to FIG. 1, a beam emitted from the reflector 2 has a parallel component and a divergent component because the size of the lamp (arc) 1 in the lamp unit 3 is limited. The beam's parallel component and divergent component are directed onto the first lens array 5. In the vicinity of the focal points for the lens cells 5a–5x of the first lens array 5 are the corresponding lens cells 6a–6x of the second lens array 6, so some of the light rays emitted from the lens cells 5a–5x of the first lens array 5 enter the corresponding lens cells 6a–6x of the second lens array 6 and other light rays enter lens cells in the vicinity of the corresponding lens cells of the second lens array 6, as illustrated in FIG. 4A.

FIG. 4A is a schematic diagram illustrating how light rays from the first and second lens arrays are directed onto the color separation mirrors.

Referring to FIG. 4A, assuming that for a lens cell 5n of the first lens array 5, a lens cell 6n (of the second lens array 6) corresponding to the lens cell 5n is located in the vicinity of the focal point for the lens cell 5n, some (32) of the light rays emitted from the lens cell 5n enter the lens cell 6n and the other light rays (33a, 33b) enter lenses adjacent to the lens cell 6n. The light rays 32 are emitted from the second lens array 6 as principal light while the light rays 33a, 33b are emitted from the second lens array 6 as unwanted light. In short, some of the light rays from the lens cells 5a–5x of the first lens array 5 enter the corresponding lens cells 6a–6x of the second lens array 6 and the other light rays enter lens cells adjacent to the corresponding lenses and exit from the second lens array 6 as principal light and unwanted light, respectively. The principal light 32 from the second lens array 6 is condensed by the illumination system (the first and second collimator lenses 7, 8, etc.) so that the principal light rays from the lens cells 5a–5x of the first lens array 5 gather one upon another in the vicinity of the dichroic mirrors 9R, 9G, 9B to form an image of light with the same shape as that of the first lens cells as a principal light image. Likewise, unwanted light 33a, 33b, etc. are focused to form an unwanted light image with the same shape as that of the first lens cells, in the vicinity of the principal light image.

Accordingly, if both the unwanted light 33a and 33b and principal light 32 are separated into R, G, and B light rays and reflected by the color separation mirrors 9, R, G, and B light rays as unwanted light (respectively reflected by the R, G, and B dichroic mirrors) would be mixed with each other on a reflective surface of the reflection type rotary polyhedron 13 and directed onto the panel 21, which might cause mixing of colors or color purity deterioration.

In order to prevent this, in this embodiment, the dichroic mirror 9R for R light, dichroic mirror 9G for G light, dichroic mirror 9B for B light, which constitute a color separation mirror set 9, are sized so that most of the principal light 32 reaches them while unwanted light 33a and 33b adjacent to the principal light does not reach them, as illustrated in FIG. 4A.

In one embodiment, the mirrors 9R, 9G and 9B have substantially the same dimensions x and y, as illustrated collectively in FIG. 4B. The dimensions x and y of the mirrors correspond to the dimensions X and Y of the lens cells of the first lens array 5, respectively. FIG. 4B illustrates a lens cell 50 of the first lens array 5 having dimensions X and Y, where X:Y is substantially the same as x:y.

Referring back to FIG. 4A, the color separation mirrors 9R, 9G, and 9B are slanted at a given angle, so that each has a vertical extension D2 that is slight less than its height (or length) y. The vertical extension is a vertical distance extending from an upper edge to a lower edge of the mirrors, the two edges being parallel to each other. In one embodiment, the vertical extension D1 is defined as follows: D1=D2 (d1/d2), where D2 is a vertical length of the lens cell 50, d2 is a focal length of the lens cell of the first lens array 5, and d1 is a focal length of the lens 7 provided between the second lens array 6 and the mirrors 9R, 9G, and 9B. In another embodiment, the vertical extension D1 is 90% to 110% of D2(d1/d2), or 80% to 120% of D2(d1/d2), or 70% to 130% of D2(d1/d2).

When the color separation mirrors are thus sized and provided with the vertical extension D1, most of the unwanted light 33a and 33b are filter out or does not reach the reflection type rotary polyhedron 13, and therefore does not reach the panel. As a result, the above problem (mixing of colors or color purity deterioration) can be prevented.

Further, when each of the dichroic mirrors 9R, 9G, and 9B has a function as an aperture, which removes less intense part of the principal light, intensity unevenness of the principal light is minimized to obtain an image with an even light distribution across the panel 21.

R, G, and B light reflected from the dichroic mirrors 9R, 9G, and 9B, of which sectional shape is virtually equal to that of the first lens cells, are gradually reshaped; after being reflected in the vicinity of the reflection type rotary polyhedron 13, their shape becomes similar to that of the whole second lens array so they turn into a light image having light spots in the area corresponding to the second lens cell area. In other words, the light from the lens cells 5a–5x gradually expands and turns into a light image having light spots across the second lens array 6. The light spots in the center of the second lens array 6 are large and intense while those in the peripheral area are small and less intense.

The light spots from the color separation mirrors 9 are reflected by the reflection type rotary polyhedron 13 as their shape changes from the shape of the first lens cells to that of the whole second lens array. The light image whose shape has become the same as that of the second lens array is further reshaped as it passes through an optical imaging system 16 and directed onto the panel 21 with its shape equal to that of the first lens cells. In sum, the shape of the light image is equal to that of each cell of the first lens array (first lens cells) in the vicinity of the color separation mirrors; it is equal to that of the whole second lens array in the vicinity of the reflection type rotary polyhedron 13; then again it becomes equal to that of each first lens cell on the panel 21.

Next, referring to FIGS. 5A and 5B, comparison is made between two different shapes of the second lens array where one shape is as shown in FIG. 3B and the other is square or circular as often seen in a conventional optical unit.

FIG. 5A and FIG. 5B are schematic diagrams showing light spots on the reflection type rotary polyhedron; FIG. 5A shows light spots produced by a conventional second lens array and FIG. 5B shows light spots by the second lens array according to one embodiment of the present invention.

If the second lens array is circular, the shape of light spots in the vicinity of the reflection type rotary polyhedron 13 is similar to that of the whole second lens array as stated above, so a circular red light spot 41R, green light spot 41G, and blue light spot 41B, as shown in FIG. 5A are directed onto a reflective surface of the reflection type rotary polyhedron 13, which reflects these light spots 41R, 41G, and 41B and direct them onto the panel 21. Since each light spot is circular, part of the red light spot 41R interferes with part of the green light spot 41G and part of the green light spot 41G interferes with part of the blue light spot 41B, which may cause mixing of colors and deterioration in color purity. In addition, if the area of interference, for example, between the green light spot 41G and blue light spot 41B should come in the boundary between two reflective surfaces of the reflection type rotary polyhedron 13, some of the light would be irradiated outside the panel 21 as stray light, leading to light loss. Such stray light might be reflected by PBS 18, the end face of the lens 14, lens 15 or polarizing plate 17 or the like and then brought to the panel 21 or projection lens 23, causing contrast deterioration or mixing of colors due to overlapping of stray light.

By contrast, according to this embodiment, the second lens array 6 is a rectangle with its longer side parallel to the longer sides of the rectangular first lens cells 5a–5x and therefore the red light spot 42R, green light spot 42G, and blue light spot 42B on a reflective surface of the reflection type rotary polyhedron 13 are similar in shape to the whole second lens array 6, or rectangular with no occurrence of interference, as illustrated in FIG. 5B, so mixing of colors, light loss or contrast deterioration due to stray light can be prevented.

In this embodiment, the lens cells 5a–5x of the first lens array 5 are eccentric lenses], which magnify the light rays and lead them to the corresponding lens cells 6a–6x of the second lens array 6. This means that the second lens cells 6a–6x may be large enough to reduce the possibility of light loss.

Alternatively, when the first lens cells 5a–5x (lens cells of the first lens array 5) are similar in shape to the opening of the reflector, the whole second lens array is rectangular, the first lens cells 5a–5x are eccentric lenses and the light beam directed onto the second lens array is rectangular, the same effect as produced with the lens arrays shown in FIG. 3A and FIG. 3B can be achieved, i.e. mixing of colors, stray light and light loss can be prevented.

Figure 6:
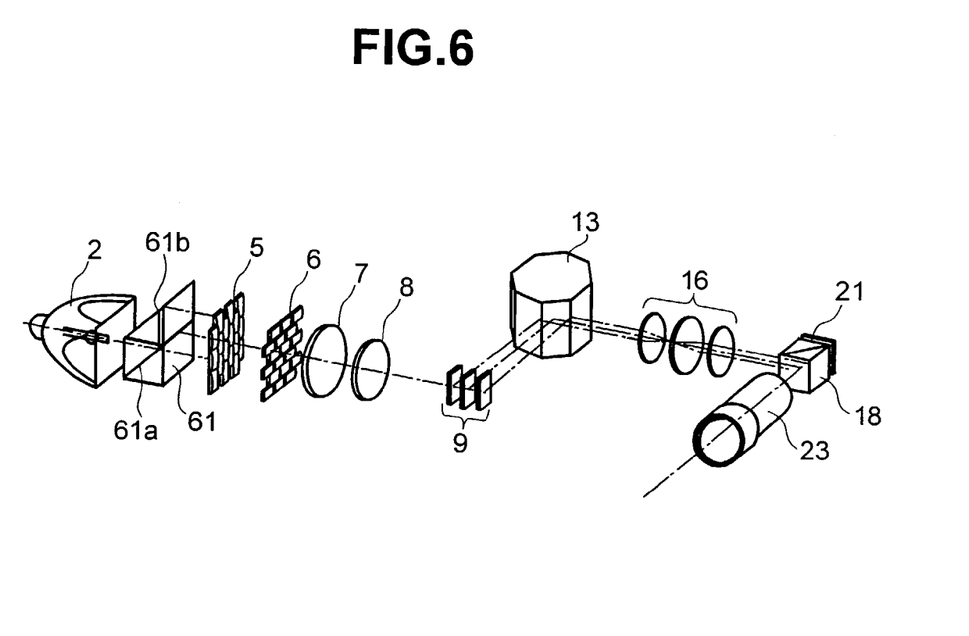
FIG. 6 is an exploded view of an optical unit according to one embodiment of the present invention.

FIG. 6 is a perspective view of an optical unit according to a second embodiment of the present invention. The elements equivalent as those shown in FIG. 1 are designated with the same reference numerals and their description is omitted here.

As shown in the figure, the outer wall of the reflector 2 is partially cut so that a rectangular beam is emitted. Part of the beam which has entered a polarization converter 61 passes through the polarization converter 61 and exits as P polarized light; then, after it is converted into S polarized light by a ½λ plate, it enters the first lens array 5. Other part of the beam is reflected by the first reflective surface 61a of the polarization converter 61, and further reflected by its second reflective surface 61b. It also enters the first lens array 5 as S polarized light. Then the light which has passed through the first and second collimator lenses 7, 8 is separated into R, G, and B light rays by the color separation mirrors 9 and the light rays go to the reflection type rotary polyhedron 13 as parallel light rays. As the R, G, and B light rays hit the polyhedron 13 parallel to each other, their incident angles on a reflective surface of the polyhedron are the same, light distribution of color light rays reflected on the reflective surface is almost the same among the R, G and B light rays. Also, the R, G and B light rays which are reflected by the reflection type rotary polyhedron 13 and directed onto the panel 21 are parallel to each other, so the light utilization efficiency on the panel 21 is increased. If the lens power in the imaging system is increased, aberration may occur. However, as parallel light rays of two colors pass through the ends of the lens in the imaging system, they are bent so the higher-power parts of the lens can be used. This means that aberration can be prevented by the use of a lens with lower power in the imaging system. As the reflection type rotary polyhedron 13 rotates, the reflected light rays become not parallel but the angles of R, G, and B light rays change in the same way so the same effect as mentioned above can be achieved.

In this embodiment, the lens cells 5a–5x of the first lens array 5 are eccentric lenses that magnify the light rays and lead them to the corresponding lens cells 6a–6x of the second lens array 6, so the second lens cells 6a–6x may be large enough to reduce the possibility of light loss. In this case, it is desirable that the first lens cells 5a–5x be similar in shape to PBS 61.

Figure 7:
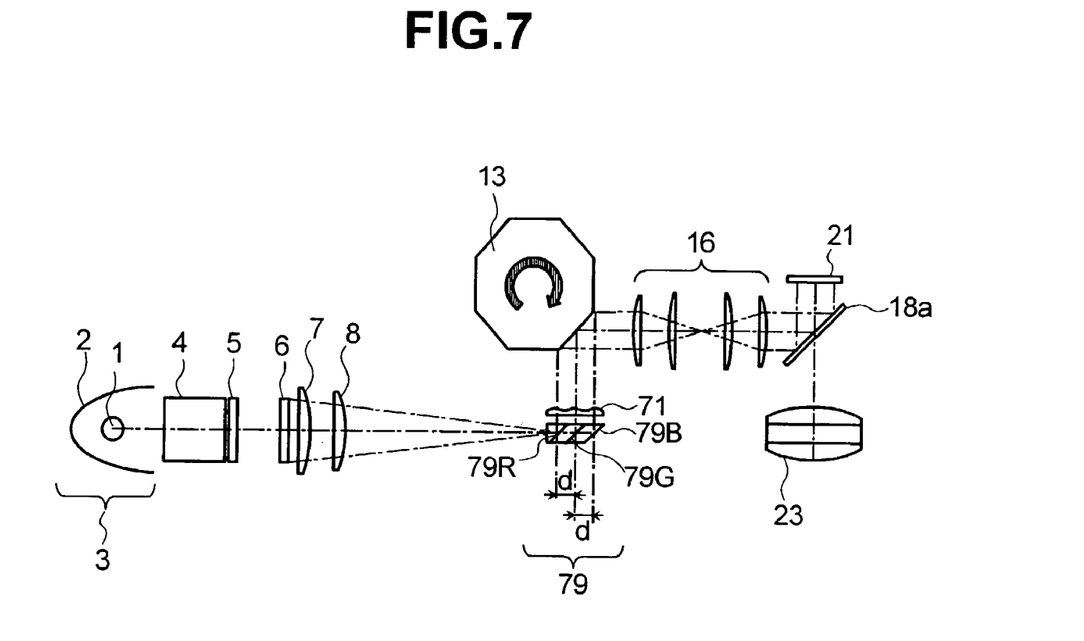
FIG. 7 shows a configuration of an optical unit according to one embodiment of the present invention.

FIG. 7 is a perspective view of an optical unit according to a third embodiment of the present invention. The elements equivalent as those shown in FIG. 1 are designated with the same reference numerals and their description is omitted here. Numeral 79 represents a color separation mirror. The color separation mirror 79 may be prepared as follows: a glass plate assembly, which consists of three glass plates with dichroic mirrors between glass plates and on the outer face of an outer glass plate, is cut into a strip in a way that the incident light side is almost perpendicular to light rays; then it is polished.

In comparison with the case as shown in FIG. 1 where the dichroic mirror 9R for R light, dichroic mirror 9G for G light, dichroic mirror 9B for B light are provided in the air, the color separation mirror 79 in this embodiment, which is made of glass and dichroic mirrors, is equal in the physical distance between mirrors, but different in the optical length. Let's assume that c represents the distance between the mirrors 9R and 9G and between the mirrors 9G and 9B as shown in FIG. 1, and d represents the distance between the mirrors 79R and 79G, and between the mirrors 79G and 79B in the color separation mirror 79 according to this embodiment, and n represents the refractive index of the glass. Even if c=d in terms of physical length, the optical length of the glass color separation mirror 79 is shorter because it is expressed by c/n (f=c/n). Therefore, it is easier to eliminate unwanted light by means of the color separation mirror 79 (mirror 79R for R light, mirror 79G for G light, and mirror 79B for B light). Besides, because the optical length of the color separation mirror 79 may be shorter, blurring in R, G, and B light spots on the panel due to defocusing can be reduced. Also, unwanted light can be eliminated by taking advantage of the shorter optical length of the color separation mirror 79. The color separation mirror 79 may have the function as an aperture to reshape principal light so as to remove less intense part of principal light in order to prevent intensity unevenness of principal light distribution and obtain an image with a uniform light distribution across the panel 21.

The lens array 71 is a combination of three lenses with each lens consisting of a central part with a specified width of a convex lens. This lens array 71 condenses light rays that would otherwise diverge, so light spots on a reflective surface of the reflection type rotary polyhedron 13 are in focus. More specifically, the size of light spots can be decreased to make light spots on the panel smaller, so the spacing between three types of light (R, G, B) may be increased to prevent color light rays from being mixed. Smaller light spots can prevent guard band erosion on the panel, which makes it possible to take enough time to write data.

Condensation of light by the lens array 71 eliminates the need for use of a thick lens in the imaging system so that aberration due to an imaging lens can be prevented.

In this embodiment, since the light rays coming from the color separation mirror 79 are parallel to each other and also the light rays from the reflection type rotary polyhedron 13 are parallel to each other, the optical path lengths of R, G, and B light rays from the color separation mirror 79 to the panel 21 are virtually equal and thus R, G and B light spots on the panel are almost identical in size. For this reason, a good color balance is ensured and a decline in brightness can be prevented. In addition, the fact that the light rays emitted from the color separation mirror 79 and the reflection type rotary polyhedron 13 are parallel offers another advantage: the same effect as explained with reference to FIG. 6 can be achieved.

Figure 8:
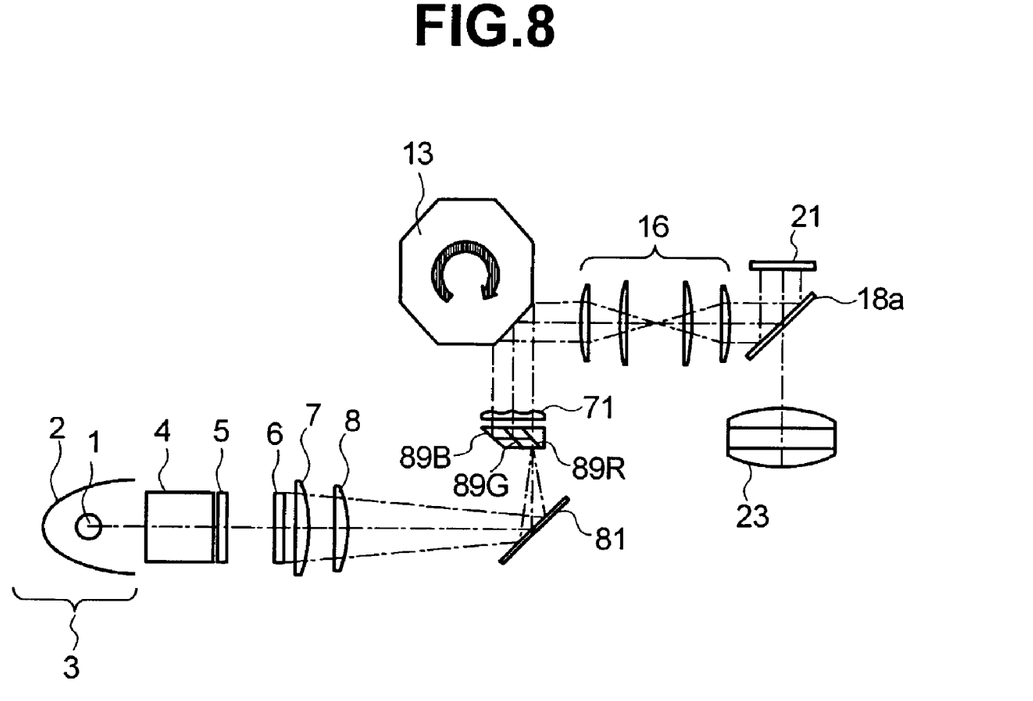
FIG. 8 shows a configuration of an optical unit according to one embodiment of the present invention.

The glass color separation mirror 79 is a small dichroic prism and may be structured as shown in FIG. 8

FIG. 8 shows the general structure of an optical unit (an imaging device) according to a fourth embodiment of the present invention. As illustrated by the glass separation mirror 89 in the figure, arrangements may be made so that light from the second lens array in the illumination system is made to enter the color separation mirror 89 from below as shown, and R light rays are transmitted and G and B light rays are reflected. In this case, R, G, and B light spots on the reflection type rotary polyhedron 13 are similar in size, and size differences due to optical path differences may be eliminated. Also, as shown in FIG. 8, the optical paths may be bent by a reflection mirror 81 or the like, when needed for structural integrity.

In this embodiment, a planar PBS 18a as an analyzer is used. This produces the same effect as the prism PBS 18 as shown in FIG. 1.

Figure 9:
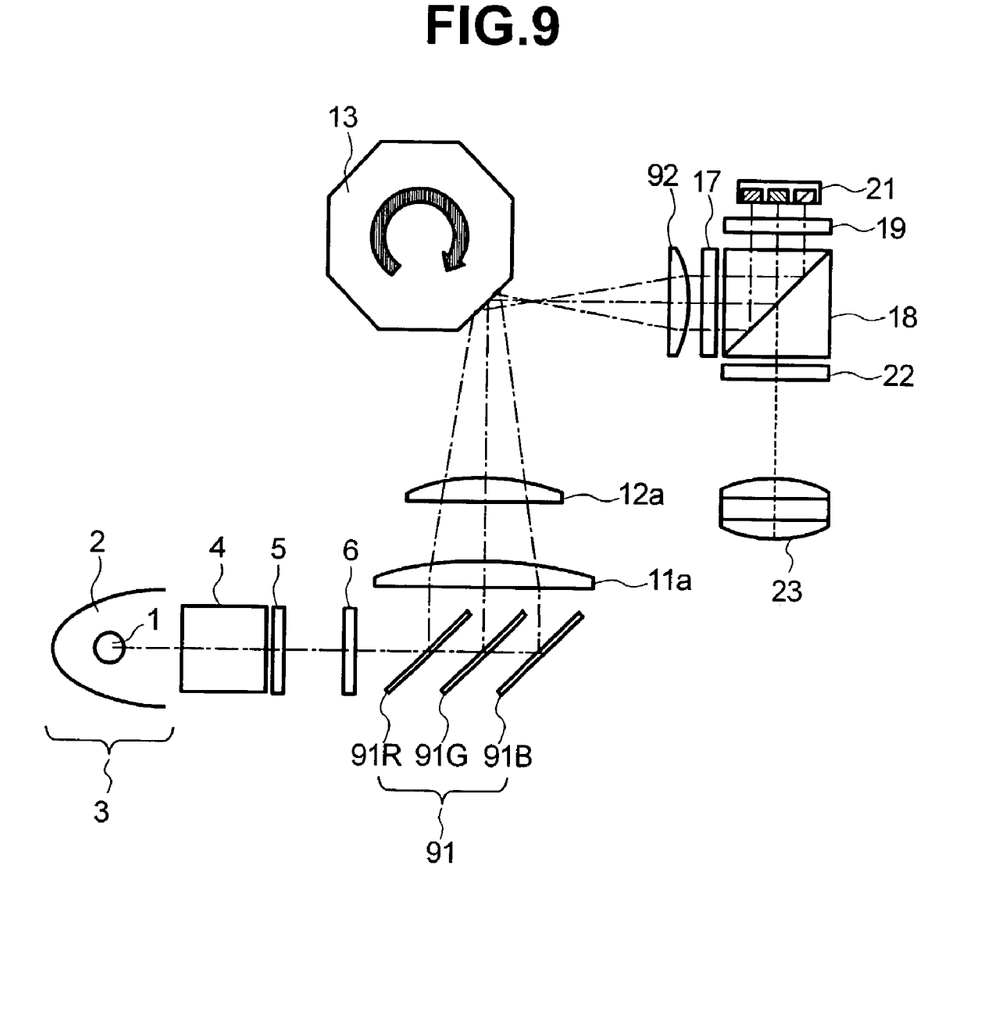
FIG. 9 shows a configuration of an optical unit according to one embodiment of the present invention.

FIG. 9 shows the general structure of an optical unit according to a fifth embodiment of the present invention.

The elements equivalent as those shown in FIG. 1 are designated with the same reference numerals and their description is omitted. Numeral 91 represents a color separation assembly, which includes a color separation mirror for R light 91R, a color separation mirror 91G for G light, and a color separation mirror 91B for B light. The light rays emitted from the color separation mirrors 91R, 91G, and 91B are substantially parallel to each other and focused on the reflection type rotary polyhedron 13 by first and second lenses 11a and 12a, having functions of focusing light. The lenses 11a and 12a are also referred to as collimator lenses. The R, G, and B light rays reflected by the reflection type rotary polyhedron 13 intersects each other's path, enter a condenser lens 92 exit it substantially parallel to each other, and then enter the PBS 18.

There are no lenses such as collimator lenses between the second lens array 6 and the color separation mirror assembly 91, and R, G, and B light rays reflected by the reflection type rotary polyhedron 13 are made almost parallel by the condenser lens 92 without using any imaging lens.

When the second lens array 6 is structured as shown in FIG. 3B, R, G, and B color light spots on the reflection type rotary polyhedron 13 do not overlap so an imaging system is no longer needed. In this embodiment, unwanted light is generated by the color separation mirrors 91. As a countermeasure, an aperture may be installed in the R, G, and B light paths from the color separation mirrors 91 to the reflection type rotary polyhedron 13 in order to prevent unwanted light from reaching the reflection type rotary polyhedron 13, if necessary. The color separation mirrors 91 may be designed taking it into account that when the distance between the first lens array 5 and the second lens array 6 is shorter, the angle between principal light and unwanted light emitted from the second lens array 6 is larger, and the distance between principal light and unwanted light is larger.

Figure 10:
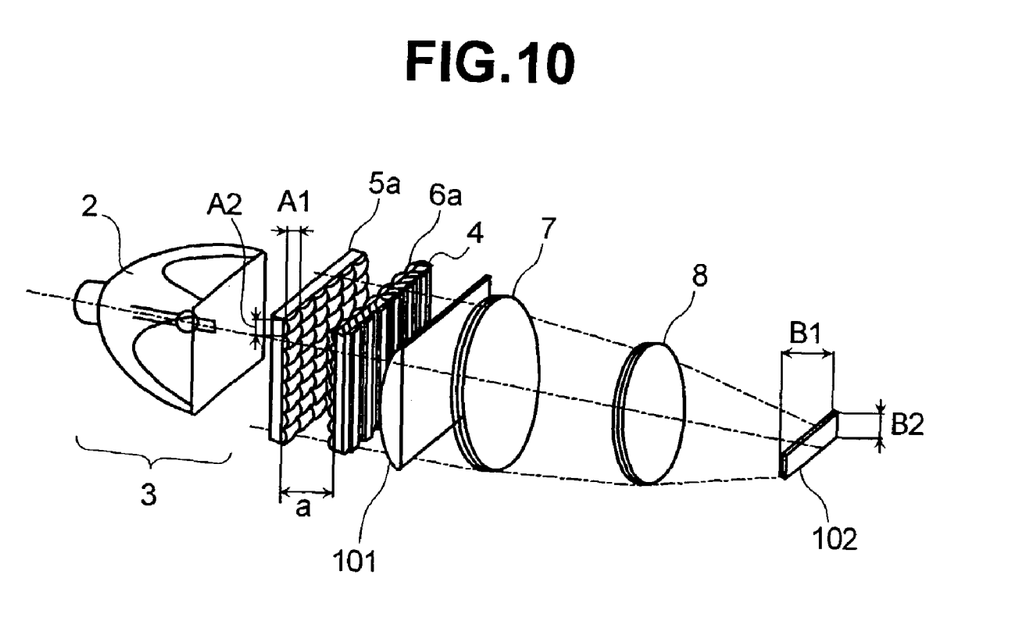
FIG. 10 is an exploded view of an optical unit according to one embodiment of the present invention.

FIG. 10 is an exploded view of an optical unit according to a sixth embodiment of the present invention. In FIG. 10, the elements equivalent as those shown in FIG. 1 are designated with the same reference numerals and their description is omitted.

Regarding the first lens array 5 shown in FIG. 1, the shorter side of each lens cell should be short enough, as explained with reference to FIG. 1, for easy manufacture of the first lens array. A solution to this problem is to use first lens cells whose shorter-to-longer-side ratio is as close to 1 (i.e. a square) as possible and change the ratio to a desired ratio by means of color separation mirrors. This embodiment may adopt this approach to make manufacture of the first lens array easier.

As shown in FIG. 10, the lens cell of the first lens array 5a is closer in shape to a square than the first lens cell image required on the color separation mirror. In one embodiment, a length-to-width ratio of the first lens cell is from 1:1 to 3:16. Each lens cell of the second lens array 6a is similar to a square, as that shown in FIG. 1. In this embodiment, the lens cells in the first and second lens arrays 5a and 6a are not arranged in a staggered pattern but may be so arranged.

Referring to FIG. 10, light rays emitted from the first and second lens arrays 5a and 6a are converted by PBS 4 as an analyzer into S polarized light or P polarized light, then passed through a cylindrical lens 101, a first collimator lens 7 and a second collimator lens 8 and reaches color separation mirrors (not shown). A numeral 102 shows a light spot formed, for example, on a color separation mirror for G light.

In FIG. 10, the longer side of each lens cell of the first lens array 5a and its shorter side are expressed by A1 and A2, respectively; the distance between the first lens array 5a and the second lens array 6a is expressed by a. The combined focal length of the cylindrical lens and collimator lenses in the direction of the shorter side of the first lens cell is expressed by b1, and that in the direction of the longer side of the first lens cell is expressed by b2. The length of the longer side of the corresponding light spot 102 is expressed by B1, and the length of the shorter side of the light spot 102 is expressed by B2. Here, the following relations hold: magnification M1 (=B1/A1)=b2/a and magnification M2(=B2/A2)=b1/a. Therefore, when the relation of M1>M2, namely b2>b1 is satisfied, the ratio of the shorter to longer side ratio of the light spot is smaller than the ratio of the shorter to longer side ratio of the first lens cell.

In this embodiment, the length ratio of the shorter side of a light spot on a color separation mirror against its longer side can be decreased in this way, so that the shorter side of each lens cell of the first lens array may be longer than would be otherwise required. This makes it easier to manufacture the first lens array 5a.

The shape of each lens cell of the first lens array is closer to a square than that in the embodiment of FIG. 1, thereby reducing light loss. The shorter side of the light spot 102 is shorter, which minimizes the possibility of occurrence of unwanted light.

In the above embodiments, the plurality of reflective surfaces of the rotary polyhedron, which are arranged like a ring around the central axis, are flat and straight plans. However, the present invention is not limited thereto. The reflective surfaces may be curved. If the reflective surfaces are curved, it is possible to control the scrolling speed of R, G and B light rays on the display device, to be almost constant.

As aforementioned, according to this embodiment, it is less likely that mixing of light spots of plural colors on the panel and contrast deterioration occur. In addition, the light utilization efficiency can be improved.

The foregoing invention has been described in terms of preferred embodiments. However, those skilled, in the art will recognize that many variations of such embodiments exist. Such variations are intended to be within the scope of the present invention and the appended claims.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A projection type image display apparatus, comprising:
a light source to emit light:
a polarizing beam splitter to polarize the light received from the light source;
a first lens array including a plurality of first lens cells having rectangular shapes to receive the light from the polarizing beam splitter, each first lens cell having a first side and a second side, the first side being longer than the second side, the first lens array having a rectangular shape, the first lens array having a third side and a fourth side, the third side being longer than the fourth side, the first sides of the first lens cells and the third side of the first lens array extending along a first direction;
a second lens array including a plurality of second lens cells having rectangular shapes and being configured to receive the light from the first lens array, the second lens array having a rectangular shape and having a fifth side and a sixth side, the fifth and sixth sides of the second lens array having substantially the same dimensions as the third and fourth sides of the first lens array, each of the second lens cells having a seventh side and an eighth side that is longer than the seventh side, the eighth sides of the second lens cells and the fifth side of the second lens array extending along a second direction that is different from the first direction;

a color separator configured to separate the light from the second lens array into a plurality of light rays of different colors;

an image display device configured to form an optical image from the plurality of light rays;

a projector configured to project the plurality of light rays emitted from the image display device as a color image; and a rotary polyhedron configured to receive the plurality of light rays from the color separator and direct the plurality of light rays onto the image display device, the directed plurality of light rays having optical axes in different directions.

2. The apparatus of claim 1, wherein the plurality of first lens cells are arranged in a staggered pattern along the first direction and the plurality of second lens cells are arranged in a staggered pattern along a second direction that is perpendicular to the first direction.

3. The apparatus of claim 1, wherein at least two of the directed plurality of light rays by the rotary polyhedron crosses a path of the other prior to reaching the image display device.

4. The apparatus of claim 1, wherein the first side of the first lens having a length L and the second side of the first lens having a width W, wherein a ratio of L:W is 4:1 or less.

5. The apparatus of claim 4, wherein the ratio of L:W is greater than or equal to 16:9/4.

6. A projection type image display apparatus, comprising:
a light source to emit light;
a polarizing beam splitter to polarize the light received from the light source;
a first lens array including a plurality of first lens cells having rectangular shapes to receive the light from the polarizing beam splitter;
a second lens array including a plurality of second lens cells and being configured to receive the light from the first lens array and emit principal light and unwanted light;
a color separator configured to separate the principal light from the second lens array into a plurality of light rays of different colors and prevent the unwanted light from being added to the plurality of light rays;
a rotary polyhedron configured to receive the plurality of light rays from the color separator and direct the plurality of light rays onto the image display device, the directed plurality of light rays having optical axes in different directions;
an image display device configured to form an optical image from the plurality of light rays; and
a projector configured to project the plurality of light rays emitted from the image display device as a color image.

7. The apparatus of claim 6, wherein the first lens cells of the first lens array are eccentric lenses and the first lens array emits a beam with a rectangular cross section.

8. The apparatus of claim 6, wherein at least two of the directed plurality of light rays by the rotary polyhedron crosses a path of the other prior to reaching the image display device.

9. The apparatus of claim 6, wherein each first lens cell having a first side and a second side, the first side being longer than the second side, the first lens array having a rectangular shape, the first lens array having a third side and a fourth side, the third side being longer than the fourth side, the first sides of the first lens cells and the third side of the first lens array extending along a first direction, wherein, the second lens array has a rectangular shape and having a fifth side and a sixth side, the fifth and sixth sides of the second lens array having substantially the same dimensions as the third and fourth sides of the first lens array.

10. The apparatus of claim 9, wherein the plurality of first lens cells are arranged in a staggered pattern along the first direction and the plurality of second lens cells are arranged in a staggered pattern along a second direction that is perpendicular to the first direction.

11. The apparatus of claim 9, wherein the first and second sides of each of the plurality of first lens cells are a length L and a width W, respectively, wherein a ratio of L:W is 4:1 or less.

12. The apparatus of claim 10, wherein the color separator includes a dicbroic mirror provided with a slight tilt, the mirror having a vertical extension of D1, the vertical extending D1 being a vertical distance extending between first and second edges of the mirror that are extending along the second direction, wherein the vertical extension D1 of the mirror is defined by the following relationship:

$$(0.7)D2(d1/d2)<D1<(1.3)D2(d1/d2),$$

where D2 is a length of the first side of the first lens cell, d2 is a focal length of the first lens cell, and d1 is a focal length of a lens provided between the second lens array and the dichroic mirror.

13. The apparatus of claim 12, wherein the vertical extension D1 is defined by the following relationship:

$$(0.8)D2(d1/d2)<D1<(1.2)D2(d1/d2).$$

14. A projection type image display apparatus comprising:
a light source;
a first lens array including a plurality of first lens cells having first, second, third and fourth sides and being configured to receive light from the light source, the first and third sides facing each other and the second and fourth sides facing each other, the first and second, having lengths of D1 and D2, respectively;
a second lens array including a plurality of second lens cells and being configured to receive the light from the first lens array;
a cylindrical lens configured to receive the light from the second lens array and emit the light to an optical component, the cylindrical lens forming a light spot on the optical component, the light spot having fifth, sixth, seventh, and eighth sides corresponding to the first, second, third, and fourth sides of one of the first lens cell, the fifth and sixth sides having lengths of D5 and D6, respectively;
a lens assembly configured to converge at least a portion of the light emitted from the cylindrical lens;
a color separator configured to receive the light from the cylindrical lens via the collimator lens and separate the light into a plurality of light rays of different colors, the color separator being the optical component whereon the light spot is formed, wherein a ratio of D5 to D6 is different than a ratio of D1 to D2;

a rotary polyhedron configured to receive the plurality of light rays from the color separator and direct the plurality of light rays onto an image display device that is configured to form optical images from the directed plurality of light rays received from the rotary polyhedron, wherein two or more of the directed plurality of light rays having optical axes extending in different directions; and a projector configured to project light rays emitted from the image display device as a color image.

15. The apparatus of claim 14, wherein the length D1 of the first side of the first lens cell is shorter than the length D2 of the second side of the first lens cell, and a combined focal length of the cylindrical lens and collimator lens in a direction of the first side of the first lens cell is shorter than a combined focal length of the cylindrical lens in a direction of the second side of the first lens cell, so that the ratio of D5 to D6 less than the ratio of D1 to D2.

* * * * *